United States Patent
Wu et al.

(10) Patent No.: US 8,529,791 B2
(45) Date of Patent: *Sep. 10, 2013

(54) GREEN-EMITTING, GARNET-BASED PHOSPHORS IN GENERAL AND BACKLIGHTING APPLICATIONS

(75) Inventors: Yusong Wu, Changshu (CN); Dejie Tao, Fremont, CA (US); Shifan Cheng, Dublin, CA (US); Yi-Qun Li, Danville, CA (US)

(73) Assignee: Intematix Corporation, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/181,226

(22) Filed: Jul. 12, 2011

(65) Prior Publication Data

US 2012/0112130 A1    May 10, 2012

Related U.S. Application Data (63) Continuation-in-part of application No. 11/975,356, filed on Oct. 18, 2007, now Pat. No. 8,133,461.

(60) Provisional application No. 61/364,321, filed on Jul. 14, 2010, provisional application No. 60/853,382, filed on Oct. 20, 2006.

(51) Int. Cl.
C09K 11/02 (2006.01)
C09K 11/08 (2006.01)
H01J 1/62 (2006.01)

(52) U.S. Cl.
USPC .............. 252/301.4 R; 252/301.4 H; 313/500

(58) Field of Classification Search
None
See application file for complete search history.

(56) References Cited

U.S. PATENT DOCUMENTS 5,037,577 A    8/1991   Yamanoi et al.
5,600,202 A    2/1997   Yamada et al.
(Continued)

FOREIGN PATENT DOCUMENTS

CN    1254747 A    5/2000
DE    19934126 A1  1/2001
(Continued)

OTHER PUBLICATIONS

Baccaro, S. et al., Influence of Si-codoping on YAG:Ce scintillation characteristics, IEEE Transactions on Nuclear Science, Aug. 2005, pp. 1105-1108, vol. 52, No. 4.

(Continued)

*Primary Examiner* — Melvin C Mayes
*Assistant Examiner* — Stefanie Cohen
(74) *Attorney, Agent, or Firm* — David H. Jaffer; Pillsbury Winthrop Shaw Pittman LLP (57) ABSTRACT

Disclosed herein are green-emitting, garnet-based phosphors having the formula $(Lu_{1-a-b-c}Y_aTb_bA_c)_3(Al_{1-d}B_d)_5(O_{1-e}C_e)_{12}$:Ce,Eu, where A is selected from the group consisting of Mg, Sr, Ca, and Ba; B is selected from the group consisting of Ga and In; C is selected from the group consisting of F, Cl, and Br; and $0 \leq a \leq 1$; $0 \leq b \leq 1$; $0 < c \leq 0.5$; $0 \leq d \leq 1$; and $0 < e \leq 0.2$. These phosphors are distinguished from anything in the art by nature of their inclusion of both an alkaline earth and a halogen. Their peak emission wavelength may lie between about 500 nm and 540 nm; in one embodiment, the phosphor $(Lu,Y,A)_3Al_5(O,F,Cl)_{12}$:$Eu^{2+}$ has an emission at 540 nm. The FWHM of the emission peak lies between 80 nm and 150 nm. The present green garnet phosphors may be combined with a red-emitting, nitride-based phosphor such as $CaAlSiN_3$ to produce white light.

36 Claims, 9 Drawing Sheets

(56) References Cited

U.S. PATENT DOCUMENTS

| | | | |
|---|---|---|---|
| 5,998,925 | A | 12/1999 | Shimizu et al. |
| 6,013,199 | A | 1/2000 | McFarland et al. |
| 6,069,440 | A | 5/2000 | Shimizu et al. |
| 6,245,259 | B1 | 6/2001 | Hohn et al. |
| 6,409,938 | B1 * | 6/2002 | Comanzo ............... 252/301.4 R |
| 6,669,866 | B1 | 12/2003 | Kummer et al. |
| 6,869,544 | B2 | 3/2005 | Chen et al. |
| 7,029,602 | B2 | 4/2006 | Oshio |
| 7,267,786 | B2 | 9/2007 | Fiedler et al. |
| 7,521,862 | B2 | 4/2009 | Mueller et al. |
| 7,573,072 | B2 * | 8/2009 | Setlur et al. .................. 257/98 |
| 7,575,697 | B2 | 8/2009 | Li et al. |
| 7,753,553 | B2 | 7/2010 | Justel et al. |
| 2003/0001495 | A1 | 1/2003 | Liu et al. |
| 2003/0203205 | A1 | 10/2003 | Bi et al. |
| 2004/0000862 | A1 | 1/2004 | Setlur et al. |
| 2004/0173807 | A1 | 9/2004 | Tian et al. |
| 2004/0256974 | A1 | 12/2004 | Mueller-Mach et al. |
| 2005/0092408 | A1 | 5/2005 | Lauf et al. |
| 2005/0093442 | A1 | 5/2005 | Setlur et al. |
| 2005/0141240 | A1 | 6/2005 | Hata et al. |
| 2005/0145868 | A1 * | 7/2005 | Kummer et al. .............. 257/98 |
| 2005/0242329 | A1 | 11/2005 | Fiedler et al. |
| 2006/0083694 | A1 | 4/2006 | Kodas et al. |
| 2006/0158097 | A1 | 7/2006 | Juestel et al. |
| 2006/0164005 | A1 | 7/2006 | Sun |
| 2008/0018235 | A1 | 1/2008 | Wang et al. |
| 2008/0138268 | A1 | 6/2008 | Tao et al. |
| 2008/0203892 | A1 | 8/2008 | Schmidt et al. |
| 2008/0231171 | A1 | 9/2008 | Schmidt et al. |
| 2008/0296596 | A1 | 12/2008 | Setlur et al. |
| 2009/0072710 | A1 | 3/2009 | Schmidt et al. |
| 2009/0174310 | A1 | 7/2009 | Vogt et al. |
| 2009/0212314 | A1 | 8/2009 | Im et al. |
| 2010/0085728 | A1 | 4/2010 | Seto et al. |
| 2010/0225226 | A1 | 9/2010 | Murazaki et al. |

FOREIGN PATENT DOCUMENTS

| | | |
|---|---|---|
| EP | 1378556 A2 | 1/2004 |
| EP | 1589090 A2 | 10/2005 |
| WO | 2004/084261 A2 | 9/2004 |
| WO | WO2006/129559 | 5/2006 |

OTHER PUBLICATIONS

Kim et al., Synthesis and Luminescent Characterization of Zinc Thiogallat, Journal of the European Ceramic Society, Mar. 26, 2007, pp. 3667-3670, vol. 27.

Wu, J. L. et al., Spectral properties of various cerium doped garnet phosphors for application in white GaN-based LEDs, Materials Research Society Symposium Proceedings, Jan. 1, 2001, pp. GG11.8.1-GG11.8.6, vol. 658.

Fernandez, A. et al., Highly porous yttrium aluminum garnet (YAG) particles synthesized by a gel supported precipitation (GSP) process, Journal of Materials Science, Jan. 2003, pp. 2331-2335, vol. 38.

Kang et al, YAG:Ce phosphor particles prepared by ultrasonic spray pyrolysis, Materials Research Bulletin, 2000, pp. 789-798.

Li, H.-L. et al., Fabrication of Transparent Cerium-Doped Lutetium Aluminum Garnet Ceramics by Co-Precipitation Routes, Journal of the American Ceramic Society, 2006, pp. 2356-2358, vol. 89, No. 7.

Kuru, Y. et al., Yttrium Aluminum Garnet as a Scavenger for Ca and Si, Journal of the American Ceramic Society, 2008, pp. 3663-3667, vol. 91, No. 11.

* cited by examiner

FIG. 1

XRD pattern of $Y_{2.91}Ce_{0.09}Al_5O_{12}$ with different $MgF_2$ additive concentration

FIG. 2

XRD pattern of $Lu_{2.91}Ce_{0.09}Al_5O_{12}$ with different $MgF_2$ additive concentration

FIG. 3

XRD pattern of $Lu_{2.91}Ce_{0.09}Al_5O_{12}$ with 5wt% $MgF_2$ and 5wt% $SrF_2$ additive

FIG. 4

Emission Spectra of $Y_{2.91}Ce_{0.09}Al_5O_{12}$ with different $MgF_2$ additive concentration

FIG. 5

Normalized Emission Spectra of $Y_{2.91}Ce_{0.09}Al_5O_{12}$ with different $MgF_2$ additive concentration

FIG. 6

Emission Spectra of $Lu_{2.91}Ce_{0.09}Al_5O_{12}$ with different $MgF_2$ additive concentration

FIG. 7

Normalized Emission Spectra of $Lu_{2.91}Ce_{0.09}Al_5O_{12}$ with different $MgF_2$ additive concentration

FIG. 8

Normalized Emission Spectra of $Lu_{2.91}Ce_{0.09}Al_5O_{12}$ with different 5wt% $MgF_2$ and 5wt% $SrF_2$ additive

FIG. 9

Emission wavelength of $Lu_{2.91}Ce_{0.09}Al_5O_{12}$ vs $SrF_2$ additive concentration

FIG. 10

Normalized Excitation Spectra of $Lu_{2.91}Ce_{0.09}Al_5O_{12}$ with different $MgF_2$ additive concentration

FIG. 11

Temperature dependence of $Lu_{2.91}Ce_{0.09}Al_5O_{12}$ with 5%wt $MgF_2$ additive compared with commercial Ce:YAG phosphors

FIG. 12

Spectra of a white LED that contained blue InGaN LED, red phosphor $(Ca_{0.2}Sr_{0.8})AlSiN_3:Eu^{2+}$ and $Lu_{2.91}Ce_{0.09}Al_5O_{12}$ with 5%wt $SrF_2$ additive

Spectra of a white LED at CIE (X=0.3, Y=0.3) that contained blue InGaN LED, red phosphor (Ca$_{0.2}$Sr$_{0.8}$)AlSiN$_3$:Eu$^{2+}$ and Lu$_{2.91}$Ce$_{0.09}$Al$_5$O$_{12}$ with 3%wt MgF$_2$ additive, Lu$_{2.91}$Ce$_{0.09}$Al$_5$O$_{12}$ with 5wt%SrF$_2$ additive and (Sr$_{0.5}$Ba$_{0.5}$)$_2$SiO$_4$:Eu$^{2+}$ phosphor

FIG. 15

GREEN-EMITTING, GARNET-BASED PHOSPHORS IN GENERAL AND BACKLIGHTING APPLICATIONS

CLAIM OF PRIORITY

This application claims the benefit of priority of U.S. Provisional Application No. 61/364,321, filed Jul. 14, 2010, entitled GREEN-EMITTING, GARNET-BASED PHOSPHORS IN GENERAL AND BACKLIGHTING APPLICATIONS, by Yusong Wu et al., and is a continuation-in-part of U.S. patent application Ser. No. 11/975,356, now U.S. Pat. No. 8,133,461, filed Oct. 18, 2007, entitled NANO-YAG:CE PHOSPHOR COMPOSITIONS AND THEIR METHODS OF PREPARATION, by Dejie Tao et al., which claims benefit of U.S. Provisional Application No. 60/853,382 filed Oct.20, 2006, entitled NANO YAG:CE PHOSPHORS AND THE METHOD OF PREPARING THE SAME, by Dejie Tao et al., which applications are incorporated herein by reference in their entirety.

BACKGROUND OF THE INVENTION

1. Field of the Invention

Embodiments of the present disclosure are directed in general to green-emitting, garnet based phosphors that are applicable to a number of different technologic areas, particularly backlighting applications. Specifically, the present disclosure is directed to lutetium-based garnets.

2. Description of the Related Art

Embodiments of the present invention are directed to cerium-doped, garnet-based phosphors. YAG:Ce is an example of such a phosphor, and this compound has for some time been used in commercial markets generating white light from so-called "white light LEDs." This latter term is a misnomer, since light emitting diodes emit light of a specific monochromatic color and not a combination of wavelengths perceived as white by the human eye, but the term is nonetheless entrenched in the lexicon of the lighting industry.

In comparison to other phosphor hosts, particularly those based on the silicates, sulphates, nitridosilicates, and oxonitridosilicates, YAG:Ce has a relatively high absorption efficiency when excited by blue light, is stable in high temperature and humidity environments, and has a high quantum efficiency (QE>95%), all the while displaying a broad emission spectrum.

If there is a disadvantage in using a YAG:Ce phosphor, and there is in certain applications, it is that the peak emission of this phosphor is too long (that is to say, too deep into the red), for use as a luminescent source in, for example, a backlighting application.

An alternative to YAG:Ce is the cerium doped $Lu_3Al_5O_{12}$ compound (LAG:Ce), which has the same crystalline structure as YAG:Ce, a similar temperature and humidity stability as the yttrium-based compound, and likewise for quantum efficiency. Despite these similarities, LAG:Ce exhibits a different peak emission wavelength than its YAG counterpart; in the lutetium case, this peak wavelength is at about 540 nm. This emission wavelength is still not short enough, however, to be useful in backlighting applications.

Thus, what is needed in the art, particularly in the fields related to backlighting technologies, is a phosphor with a garnet structure and a peak emission wavelength shorter than that of either YAG:Ce or LAG:Ce.

SUMMARY OF THE INVENTION

Embodiments of the present disclosure are directed to green-emitting, garnet-based phosphors having the general formula $(Lu_{1-a-b-c}Y_aTb_bA_c)_3(Al_{1-d}B_d)_5(O_{1-e}C_e)_{12}$:Ce, Eu, where A is selected from the group consisting of Mg, Sr, Ca, and Ba; B is selected from the group consisting of Ga and In; C is selected from the group consisting of F, Cl, and Br; $0 \leq a \leq 1$; $0 \leq b \leq 1$; $0 < c \leq 0.5$; $0 \leq d \leq 1$; and $0 < e \leq 0.2$. The "A" element, which may be any of the alkaline earth elements Mg, Sr, Ca, and Ba, used either solely or in combination, is very effective in shifting wavelength to shorter values. These compounds will be referred to in the present disclosure as "halogenated LAG-based" garnets.

In an alternative embodiment, the present green garnets may be represented by the formula $(Y, Lu, A)_x(Al)_5(O, F, Cl)_{12+(3/2)x}$; subject to the proviso that x is not equal to 3, and ranges from about 2.5 to about 3.5. As in the first formula described in this section, A is selected from the group consisting of Mg, Sr, Ca, and Ba, and ranges in content stoichiometrically from greater than equal to zero to about 0.5, relative to the total amounts of yttrium and lutetium. Yttrium and lutetium are interchangeable with one another. These compounds may be collectively described in the present disclosure as "non-integer stoichiometric compounds" based on YAG and LAG.

In an alternative embodiment, the present green-emitting, garnet-based phosphors may be described by the formula $(Y,A)_3(Al, B)_5(O,C)_{12}$:$Ce^{3+}$, where A is at least one of Tb, Gd, Sm, La, Lu, Sr, Ca, and Mg, including combinations of those elements, wherein the amount of substitution of those elements for Y ranges from about 0.1 to about 100 percent in a stoichiometric manner. B is at least one of Si, Ge, B, P, and Ga, including combinations, and these elements substitute for Al in amounts ranging from about 0.1 to about 100 percent stoichiometrically. C is at least one of F, Cl, N, and S, including combinations, substituting for oxygen in amounts ranging from about 0.1 to about 100 percent stoichiometrically.

In an alternative embodiment, the present green-emitting, garnet-based phosphors may be described by the formula $(Y_{1-x}Ba_x)_3Al_5(O_{1-y}C_y)_{12}$:$Ce^{3+}$, where x and y each range from about 0.001 to about 0.2. In a variation of this embodiment, the garnet-based phosphors may be represented by the formula $(Y_{1-x}Ba_x)_zAl_5(O_{1-y}C_y)_{12+(3/2)z}$:$Ce^{3+}$, where z is not equal to 3 in this embodiment, and ranges from about 2.5 to about 3.5. In these embodiments, when the constituent elements are yttrium, barium, aluminum, oxygen, and fluorine.

The present green-emitting, garnet based phosphors may be excited by blue light emitted by either a laser or LED (or any other such means), and used in combination with either of (or both) a yellow-green-emitting silicate phosphor and/or a red-emitting nitride-based phosphor. The red nitride may have the general formula $(Ca, Sr)AlSiN_3$:$Eu^{2+}$, further comprising an optional halogen, and wherein the oxygen impurity content of the red nitride phosphor may be less than equal to about 2 percent by weight.

DETAILED DESCRIPTION OF THE INVENTION

A yttrium aluminum garnet compound activated with the rare earth cerium (YAG:Ce) is one of the best choices of phosphor material one can make if the desired application is either high power LED lighting, or cool white lighting of a non-specific, general nature. As one might expect there, is a requirement in general lighting for highly efficient components, both in the case of the LED chip supplying blue light and excitation radiation, and in the case of the phosphor that is used in conjunction with the chip, excited by the chip, used in conjunction with the chip, and which supplies the typically yellow/green constituent of the resulting product light.

As discussed in the previous section of this disclosure, YAG:Ce does demonstrate this desired high efficiency, having a quantum efficiency greater than about 95 percent, and it would therefore appear to be a difficult task to improve upon this number. But it is known in the art that the efficiency of an LED chip increases with a decrease in emission wavelength, and thus it would appear, in theory anyway, that the efficiency of a general lighting system will be enhanced if a phosphor paired with an LED chip emitting at shorter wavelengths may be excited by those shorter wavelengths. The problem with this strategy, unfortunately, is that the emission efficiency of a YAG:Ce phosphor decreases when the wavelength of its blue excitation radiation is reduced to a level below about 460 nm.

The repercussions of this are, of course, that YAG:Ce should really only be paired with an LED chip having an emission wavelength no less than about 450 to 460 nm. But it is also known in the art that photon energies of the phosphor's excitation radiation depend strongly on the structure of the anionic polyhedron (comprising oxygen atoms in this case) surrounding the activator cation (cerium). It follows that the efficiency of the system may be enhanced if the excitation range of a garnet-based phosphor might be extended towards shorter wavelengths relative to a YAG:Ce phosphor. Thus the objects of the present invention include altering the structure and nature of this anionic polyhedron to shift the excitation range the phosphor "desires" to see to shorter wavelengths than that of the traditional YAG:Ce, while maintaining in the meantime (or even improving) the superior properties that garnets display.

The present disclosure will be divided into the following sections: first, a chemical description (stoichiometric formulas) of the present green garnets will be given, followed by a brief description of possible synthetic methods. The structure of the present green garnets will be discussed next, along with its relationship to experimental data comprising wavelength and photoluminescent changes upon the inclusion of certain halogen dopants. Finally, the role these green garnets may play in white light illumination and backlighting applications will be presented with exemplary data.

Chemical Description of the Present Green Garnets

The green emitting garnets of the present invention contain both alkaline earth and halogen constituents. These dopants are used to achieve the desired photoemission intensity and spectral properties, but the fact that simultaneous alkaline earth and halogen substitutions provide a sort of self-contained charge balance is fortuitous as well. Additionally, there may be other advantageous compensations having to do with the overall changes to the size of the unit cell: while substations of Lu for Y may tend to expand the size of the cell, the opposite effect may occur with substitutions of an alkaline earth for Y (in some cases, at any rate), and likewise with the halogen for oxygen.

There are several ways to describe the formula of the present phosphors. In one embodiment, a yellow to green emitting cerium-doped, garnet-based phosphor may be described by the formula $(Lu_{1-a-b-c}Y_aTb_bA_c)_3(Al_{1-d}B_d)_5(O_{1-e}C_e)_{12}:Ce, Eu$, where A is selected from the group consisting of Mg, Sr, Ca, and Ba; B is selected from the group consisting of Ga and In; C is selected from the group consisting of F, Cl, and Br; $0 \leq a \leq 1$; $0 \leq b \leq 1$; $0 < c \leq 0.5$; $0 \leq d \leq 1$; and $0 < e \leq 0.2$. The "A" element, which may be any of the alkaline earth elements Mg, Sr, Ca, and Ba, used either solely or in combination, is very effective in shifting wavelength to shorter values. These compounds will be referred to in the present disclosure as "halogenated LAG-based" garnets.

In an alternative embodiment, the present green garnets may be represented by the formula $(Y, Lu, A)_x(Al)_5(O, F, Cl)_{12+(3/2)x}$; subject to the proviso that x is not equal to 3, and ranges from about 2.5 to about 3.5. As in the first formula described in this section, A is selected from the group consisting of Mg, Sr, Ca, and Ba, and ranges in content stoichiometrically from greater than equal to zero to about 0.5, relative to the total amounts of yttrium and lutetium. Yttrium and lutetium are interchangeable with one another. These compounds may be collectively described in the present disclosure as "non-integer stoichiometric compounds" based on YAG and LAG.

In an alternative embodiment, the present green-emitting, garnet-based phosphors may be described by the formula $(Y,A)_3(Al, B)_5(O,C)_{12}:Ce^{3+}$, where A is at least one of Tb, Gd, Sm, La, Lu, Sr, Ca, and Mg, including combinations of those elements, wherein the amount of substitution of those elements for Y ranges from about 0.1 to about 100 percent in a stoichiometric manner. B is at least one of Si, Ge, B, P, and Ga, including combinations, and these elements substitute for Al in amounts ranging from about 0.1 to about 100 percent stoichiometrically. C is at least one of F, Cl, N, and S, including combinations, substituting for oxygen in amounts ranging from about 0.1 to about 100 percent stoichiometrically.

In an alternative embodiment, the present green-emitting, garnet-based phosphors may be described by the formula $(Y_{1-x}Ba_x)_3Al_5(O_{1-y}C_y)_{12}:Ce^{3+}$, where x and y each range from about 0.001 to about 0.2. In a variation of this embodiment, the garnet-based phosphors may be represented by the formula $(Y_{1-x}Ba_x)_zAl_5(O_{1-y}C_y)_{12+(3/2)z}:Ce^{3+}$, where z is not equal to 3 in this embodiment, and ranges from about 2.5 to about 3.5. In these embodiments, when the constituent elements are yttrium, barium, aluminum, oxygen, and fluorine, the phosphor is excitable by radiation ranging in wavelength from about 440 to about 470 nm, and exhibits a peak emission wavelength as a result that ranges from about 540 to about 560 nm.

Synthesis

Any number of methods may be used to synthesize the present green-emitting, garnet-based phosphors, involving both solid state reaction mechanisms, as well as liquid mixing techniques. Liquid mixing includes such methods as co-precipitation and sol-gel techniques.

One embodiment of preparation involves a solid state reaction mechanism comprising the steps:

(a) desired amounts of the starting materials $CeO_2$, $Y_2O_3$, lutetium salts including the nitrates, carbonates, halides, and/or oxides of lutetium, and $M^{2+}X_2$, where M is a divalent alkaline earth metal selected from the group consisting of Mg, Sr, Ca, and Ba, and X is a halogen selected from the group consisting of F and Cl were combined to form a mixture of starting powders;

(b) the mix of starting powders from step (a) is dry-mixed using any conventional method, such as ball milling, and typical mixing times using ball milling are greater than about 2 hours (in one embodiment about 8 hours);

(c) sintering the mixed starting powders from step (b) at a temperature of about 1400° C. to about 1600° C. for about 6 to about 12 hours in a reducing atmosphere (the purpose of this atmosphere is for a reduction of the ammonia-based compounds);

(d) crushing the sintered product from step (c), and washing it with water; and (e) drying the washed product from step (d), wherein the drying conditions may be constitute a time of about 12 hours at a temperature of about 150° C.

The present garnets may be synthesized by liquid mixing techniques as well. An example of the synthesis of a non-halogenated LAG compound having the formula $Lu_{2.985}Ce_{0.015}Al_5O_{12}$ using co-precipitation has been described by H.-L. Li et al. in an article titled "Fabrication of Transparent Cerium-Doped Lutetium Aluminum Garnet Ceramics by Co-Precipitation Routes," *J. Am. Ceram. Soc.* 89 [7] 2356-2358 (2006). These non-halogenated LAG compounds contained no alkaline earth constituents. The article is incorporated herein in its entirety, as it is contemplated that a similar co-precipitation method may be used to produce the halogenated LAGs of the present disclosure with alkaline earth constitutents.

An example of the synthesis of a halogenated YAG compound using a sol-gel technique has been described in U.S. Pat. No. 6,013,199 by E. McFarland et al., to Symyx Technologies, titled "Phosphor materials." These (possibly) halogenated YAG compounds contained no alkaline earth constituents. This patent is incorporated herein in its entirety, as it is contemplated that a similar sol-gel method may be used to produce the halogenated YAG compounds of the present disclosure with alkaline earth constituents.

Figure 1:
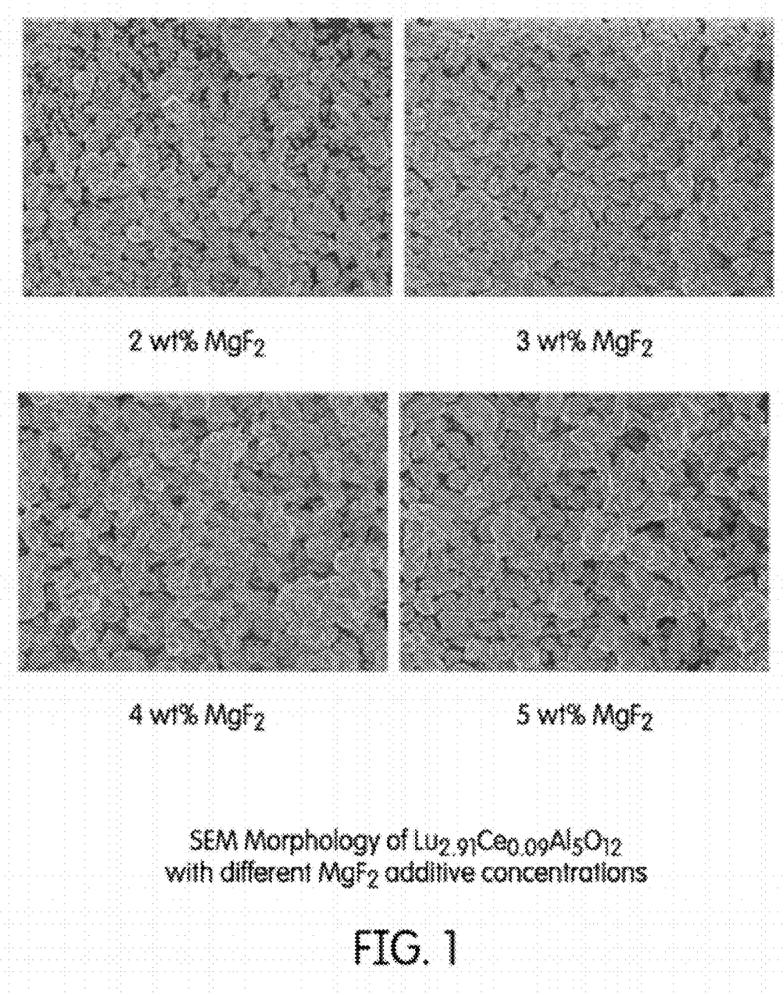
FIG. 1 shows the SEM morphology of $Lu_{2.91}Ce_{0.09}Al_5O_{12}$ with different $MgF_2$ additive concentrations, illustrating that particle sizes become larger and more homogeneous as the amount of the $MgF_2$ additive is increased.

FIG. 1 shows the SEM morphology of an exemplary $Lu_{2.91}Ce_{0.09}Al_5O_{12}$ phosphors with different $MgF_2$ additive concentrations, synthesized via the solid state mechanisms described above. The morphology as revealed by scanning electron microscope (SEM) shows that particle sizes become larger, and more homogeneous, as the amount of the $MgF_2$ additive is increased.

Crystal Structure of the Present Green Garnets

The crystal structure of the present green garnets are the same as that of the yttrium aluminum garnet, $Y_3Al_5O_{12}$, and like this well studied YAG compound, the present garnets belong to the space group Ia3d (no. 230). This space group, as it pertains to YAG, has been discussed by Y. Kuru et al. in an article titled "Yttrium Aluminum Garnet as a Scavenger for Ca and Si," *J. Am. Ceram. Soc.* 91 [11] 3663-3667 (2008). As described by Y. Kuru et al., YAG has a complex crystal consisting of 160 atoms (8 formula units) per unit cell, where the $Y^{3+}$ occupy positions of multiplicity 24, Wyckoff letter "c," and site symmetry 2.22, and the $O^{2-}$ atoms occupy positions of multiplicity 96, Wyckoff letter "h," and site symmetry 1. Two of the $Al^{3+}$ ions are situated on octahedral 16(a) positions, whereas the remaining three $Al^{3+}$ ions are positioned on tetrahedral 24(d) sites.

The lattice parameters of the YAG unit cell are a=b=c=1.2008 nm, and $\alpha=\beta=\gamma=90°$. Whereas substitution of lutetium for yttrium is expected to expand the size of the unit cell, the angles between the unit cell axes are not expected to change, and the material will retain its cubic character.

Figure 2:
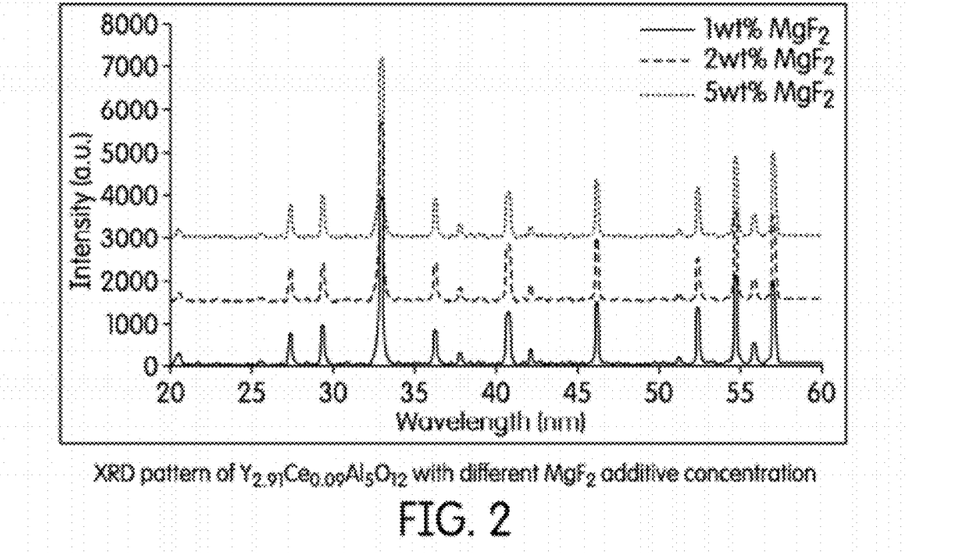
FIG. 2 is a series of x-ray diffraction (XRD) patterns of exemplary $Y_{2.91}Ce_{0.09}Al_5O_{12}$ phosphors with different $MgF_2$ additive concentrations.

FIG. 2 shows the x-ray diffraction (XRD) patterns of a series of exemplary $Y_{2.91}Ce_{0.09}Al_5O_{12}$ phosphors with different $MgF_2$ additive concentrations, showing how the addition of an alkaline earth and a halogen ($MgF_2$) component shifts high angle diffraction peaks to higher values of 2θ. This means that the lattice constants become smaller relative to a YAG component with no alkaline earth/halogen, and further indicates that $Mg^{2+}$ is being incorporated into the crystal crystal lattice, occuping $Y^{3+}$ positions.

Figure 3:
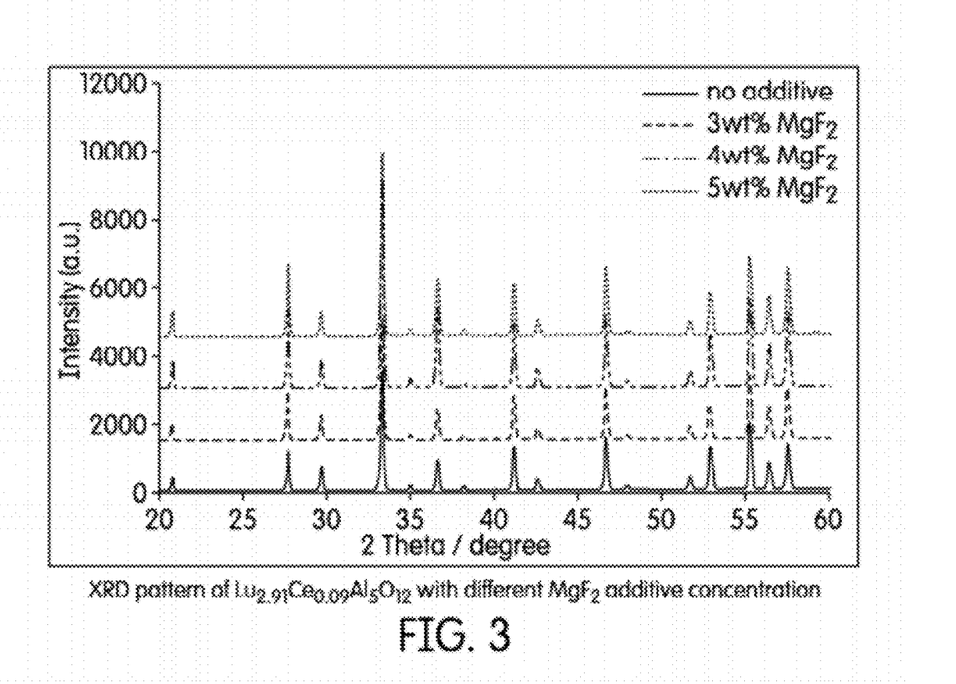
FIG. 3 is a series x-ray diffraction (XRD) patterns of exemplary $Lu_{2.91}Ce_{0.09}Al_5O_{12}$ phosphors with different $MgF_2$ additive concentrations.

FIG. 3 shows the x-ray diffraction (XRD) pattern of a series of exemplary phosphors in an analogous manner to FIG. 2, except that this time the series of compounds are $Lu_{2.91}Ce_{0.09}Al_5O_{12}$ phosphors with different $MgF_2$ additive concentrations, where lutetium-based compounds are being studied, rather than yttrium-based compounds.

Figure 4:
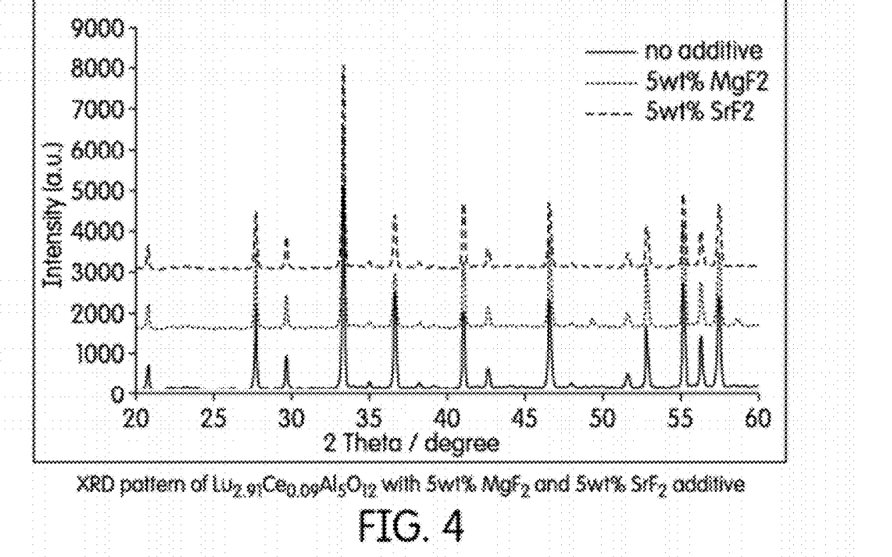
FIG. 4 is a series of the x-ray diffraction (XRD) patterns of exemplary $Lu_{2.91}Ce_{0.09}Al_5O_{12}$ phosphors having a 5 wt % $MgF_2$ additive and a 5 wt % $SrF_2$ additive.

FIG. 4 shows the x-ray diffraction (XRD) pattern of a series of exemplary $Lu_{2.91}Ce_{0.09}Al_5O_{12}$ phosphors having either a 5 wt % $MgF_2$ and 5 wt % $SrF_2$ additive: this experiment shows a comparison of the Mg constituent versus an Sr one. The data shows that with the $MgF_2$ additive in the $Lu_{2.91}Ce_{0.09}Al_5O_{12}$ lattice, high angle diffraction peak move to greater values of $2\theta$, meaning that lattice constants become smaller. Alternatively, with $SrF_2$ additive, high angle diffraction peaks move to smaller values of $2\theta$, meaning that the lattice constants increase. It will be apparent to those skilled in the art that both $Mg^{2+}$ and $Sr^{2+}$ are being incorporated into the $Lu_{2.91}Ce_{0.09}Al_5O_{12}$ lattice and occupying $Lu^{3+}$ positions. These peak shifts in position occur because $Mg^{2+}$, with its ionic radius of 0.72 Å, is smaller than $Lu^{3+}$ (0.86 Å), while $Sr^{2+}$ (1.18 Å) is bigger than $Lu^{3+}$.

Mechanism of Alkaline Earth and Halogen Influence on Optical Properties

In one embodiment of the present invention, $Ce^{3+}$ is the luminescent activator in the garnet-based phosphor. The transition between the 4f and 5d energy levels of the $Ce^{3+}$ ion corresponds to excitation of the phosphor with blue light; green light emission from the phosphor is a result from the same electronic transition. In the garnet structure, the $Ce^{3+}$ is located at the center of an octahedral site formed by a polyanionic structure of six oxygen ions. It will be appreciated by those skilled in the art that according to crystal field theory, the surrounding anions (which may also be described as ligands) induce an electrostatic potential on the 5d electron of the central cation. The 5d energy level splitting is 10Dq, where Dq is known to depend on the particular ligand species. From the spectrochemical series it may be seen that the Dq of a halide is smaller than that of oxygen, and thus it follows that when oxygen ions are replaced by halide ions, the Dq will decrease correspondingly.

The implications of this are that the band gap energy; that is to say, the energy difference between the 4f and 5d electronic levels, will increase with substitution of oxygen ions with halide in the polyanionic cages surrounding activator ions. This is why the emission peak shifts to shorter wavelength with halogen substitution. Simultaneously, with the introduction of halide ions in the oxygen polyanionic structures forming octahedral sites, a corresponding cation may also replace a portion of the Lu/Y content. If the cation replacing Lu/Y is a smaller cation, the result will be a shift of the emission peak towards the blue end of the spectrum. The emitted luminescence will have a shorter wavelength than otherwise would have occurred. In contrast, if the cation replacing Lu/Y is a larger cation, such as Sr or Ba, the result will be a shift of the emission peak towards the red end of the spectrum. In this case, the emitted luminescence will have a longer wavelength.

Combined with the effects of the halide, Mg as an alkaline earth substituent will be a better choice than Sr if a blue-shift is desired, and this will be shown experimentally in the following portions of the present disclosure. It is also known the LAG emission peak is a doublet due to spin-orbit coupling. As the blue-shift occurs, the emission with shorter wavelength is biased and its intensity increases correspondingly. This trend is not only helpful to the blue-shift of the emission, but also enhances photoluminescence.

Figure 5:
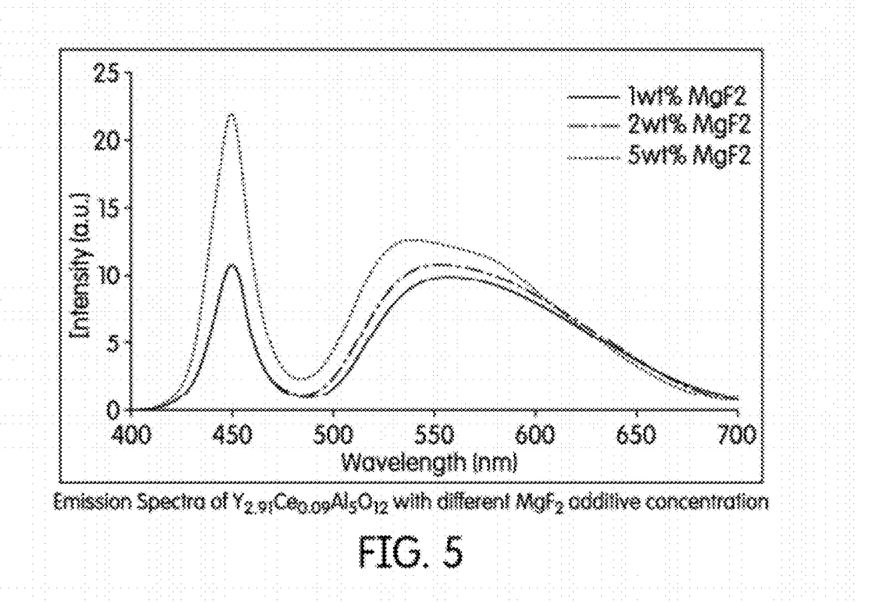
FIG. 5 is the emission spectra of a series of exemplary $Y_{2.91}Ce_{0.09}Al_5O_{12}$ phosphors with different levels of $MgF_2$ additive, the emission spectra obtained by exciting the phosphors with a blue LED.

FIG. 5 is the emission spectra of a series of exemplary $Y_{2.91}Ce_{0.09}Al_5O_{12}$ phosphors with different levels of $MgF_2$ additive, the emission spectra obtained by exciting the phosphors with a blue LED. This data shows that with increasing amounts of $MgF_2$ the photoluminescent intensity increases and the peak emission wavelength shifts to shorter values. Though not shown on FIG. 5, the present inventors have data for a 5 wt% addition of $BaF_2$ to the starting powders: this phosphor showed a significant increase in photoluminescent intensity relative to the three magnesium-containing phosphors, and a peak emission wavelength that is about the same as that of the 1 wt% sample.

Figure 6:
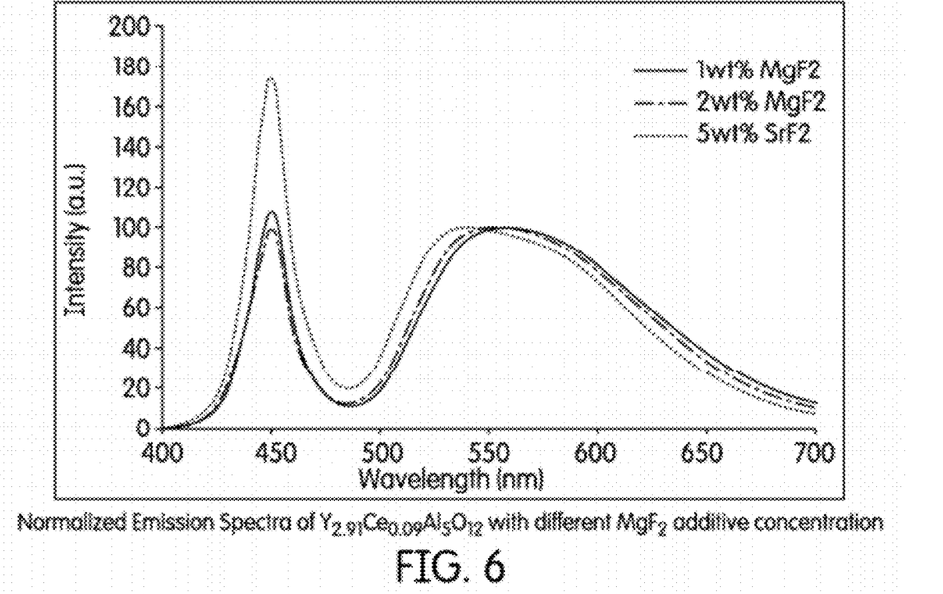
FIG. 6 is the normalized emission spectra of a series of exemplary $Lu_{2.91}Ce_{0.09}Al_5O_{12}$ phosphors with different $MgF_2$ additive concentrations under blue LED excitation.

A normalized version of the data from FIG. 5 is shown in FIG. 6. FIG. 6 is the normalized emission spectra of the same series of exemplary $Y_{2.91}Ce_{0.09}Al_5O_{12}$ phosphors with different $MgF_2$ additive concentrations under blue LED excitation, but where normalizing the photoluminescent intensity to a single value highlight that the emission peak of $Y_{2.91}Ce_{0.09}Al_5O_{12}$ shifts to short wavelength with increasing amounts of the $MgF_2$ additive, The greater the amount of the $MgF_2$ additive, the shorter the emission peak wavelength. This is the same trend demonstrated by a $Lu_{2.91}Ce_{0.09}Al_5O_{12}$ phosphor, as will be demonstrated next.

Figure 7:
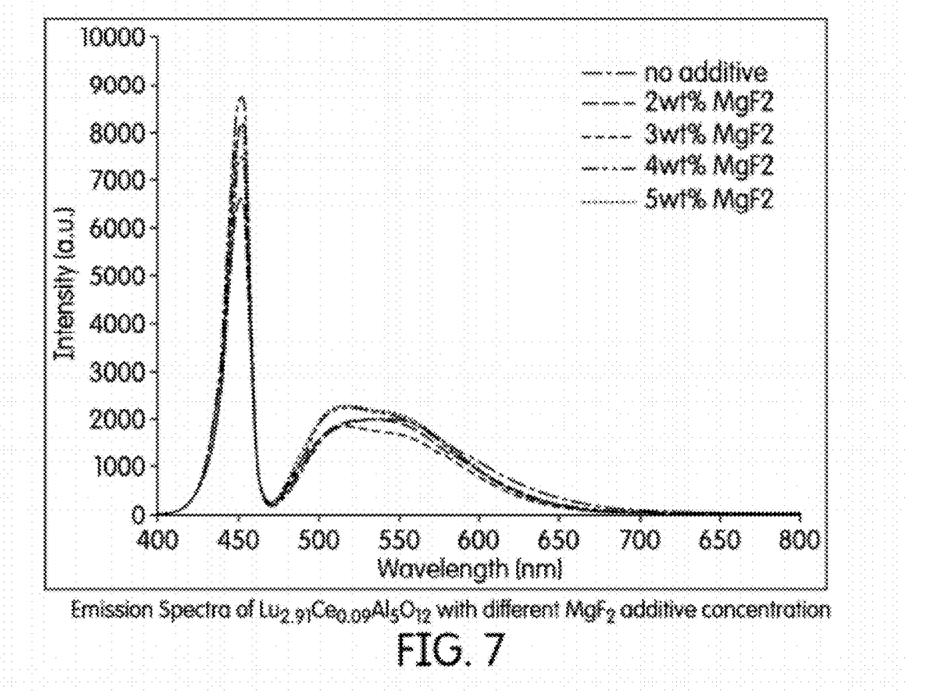
FIG. 7 is the emission spectra of $Lu_{2.91}Ce_{0.09}Al_5O_{12}$ phosphors with different $MgF_2$ additive under blue LED excitation.

FIG. 7 is the emission spectra of a series of exemplary $Lu_{2.91}Ce_{0.09}Al_5O_{12}$ phosphors with different levels of $MgF_2$ additive, the emission spectra obtained by exciting the phosphor with a blue LED. This data is analogous to that of FIG. 5, except that lutetium-based rather than yttrium-based compounds are being studied. As with the yttrium data, this data for lutetium shows similar trends for the shift in emission wavelength, though those trends for photoluminescent intensity are not, perhaps, as similar.

Figure 8:
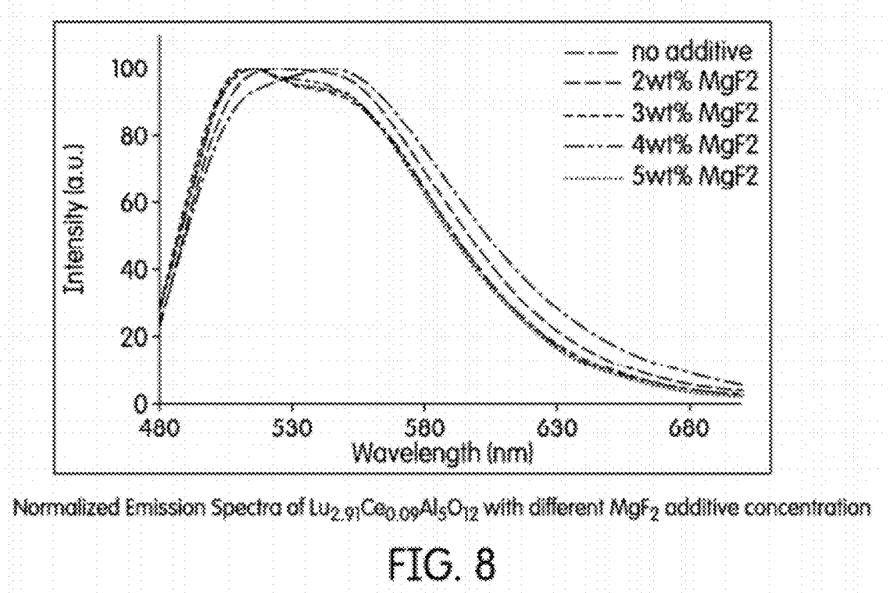
FIG. 8 is the normalized emission spectra of $Lu_{2.91}Ce_{0.09}Al_5O_{12}$ phosphors with different $MgF_2$ additive under blue LED excitation; the results show that the emission peak of $Lu_{2.91}Ce_{0.09}Al_5O_{12}$ shifts to short wavelength with certain amount of $MgF_2$ additive, and that the greater the amount of the $MgF_2$ additive, the shorter emission peak wavelength.

The $Lu_{2.91}Ce_{0.09}Al_5O_{12}$ emission spectra of FIG. 7 has been normalized to emphasize the effect of the addition of halogen salt on peak emission wavelength; the normalized version of the data is shown in FIG. 8. As in the yttrium case, peak emission shifts to shorter wavelength with increasing amounts of $MgF_2$ additive; that is to say, the greater the amount of the $MgF_2$ additive, the shorter emission peak wavelength. The amount of wavelength shift upon increasing the amount of the MgF2 additive from zero (no additive) to about 5 wt % of the additive was observed to be about 40 nm; from about 550 nm to about 510 nm.

Each of the graphs in FIGS. 5-8 have plotted their respective spectra as a series of phosphor compositions with increasing additive concentration, starting at no additive, and ending with the highest concentration of the series at 5 wt %. To emphasize a comparison of the $SrF_2$ additive with the $MgF_2$ additive; in other words, a phosphor with an Sr alkaline earth and fluorine content with a phosphor having a Mg alkaline earth and fluorine content, the phosphors have been plotted together in FIG. 9: a phosphor with no additive, a phosphor with 5 wt % $SrF_2$, and a phosphor with 5 wt % $MgF_2$. The phosphor is based on the sample $Lu_{2.91}Ce_{0.09}Al_5O_{12}$.

Figure 9:
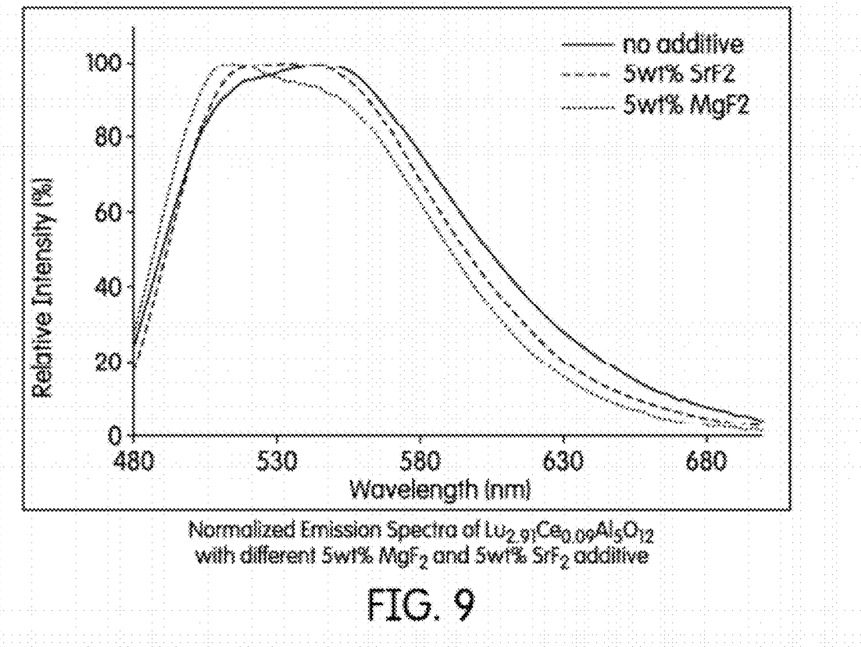
FIG. 9 is a normalized emission spectra of a $Lu_{2.91}Ce_{0.09}Al_5O_{12}$ phosphor with 5 wt % $MgF_2$ and 5 wt % $SrF_2$ additives where the phosphor has been excited with a blue LED; the results are compared with a control sample that contains no halogenated salts as an additive; the results illustrate that the emission peak shifts to shorter wavelengths with the $MgF_2$ synthesized compound than it does for the $SrF_2$ synthesized compound.

The emission spectra data in FIG. 9 has been normalized to better emphasize the effects on optical properties rendered by the inclusion of the halogen and alkaline earths. When excited with a blue LED, the result illustrates that the emission peak shifts to shorter wavelengths with the addition of $MgF_2$ and $SrF_2$. The $Lu_{2.91}Ce_{0.09}Al_5O_{12}$ sample with no additive shows a peak emission wavelength at about 550 nm; with a 5 wt% $SrF_2$ additive the peak emission wavelength shifts to about 535 nm, and with a 5 wt% $MgF_2$ additive the wavelength shifts even further to about 510 nm.

Figure 10:
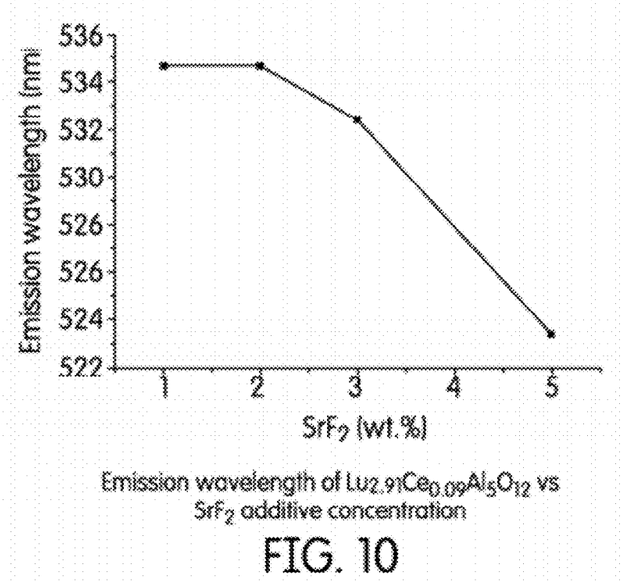
FIG. 10 shows how the emission wavelength of a series of exemplary $Lu_{2.91}Ce_{0.09}Al_5O_{12}$ phosphors decreases as the concentration of an $SrF_2$ additive is increased.

FIG. 10 shows how the emission wavelength of a series of exemplary $Lu_{2.91}Ce_{0.09}Al_5O_{12}$ phosphors decreases as the concentration of an $SrF_2$ additive is increased. Peak emission wavelength has been plotted as a function of the amount of the $SrF_2$ additive; samples having an $SrF_2$ additive content of 1, 2, 3, and 5 wt % were tested. The results show that the peak emission wavelength was about the same for the 1 and 2 wt% samples, the wavelength being about 535 nm; as the $SrF_2$ additive is increased to 3 wt % the peak emission wavelength decreases to about 533 nm. With a further increase of $SrF_2$ additive to 5 wt % peak wavelength drops precipitously to about 524 nm.

Excitation Spectra and Temperature Dependence

Figure 11:
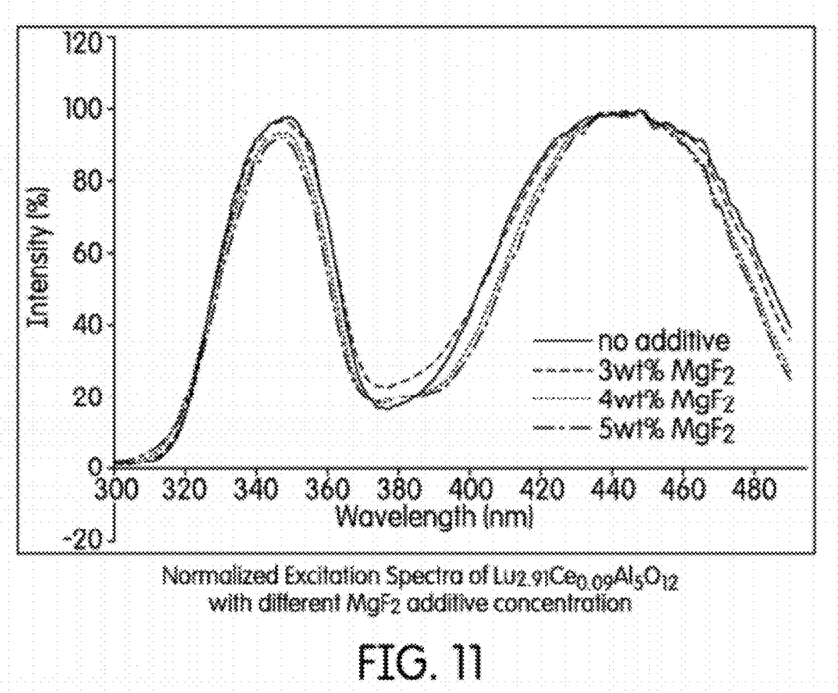
FIG. 11 is the normalized excitation spectra of a series of exemplary $Lu_{2.91}Ce_{0.09}Al_5O_{12}$ phosphors with different $MgF_2$ additive concentrations, showing that the excitation spectra becomes more narrow when the $MgF_2$ additive concentration is increased.

FIG. 11 is the normalized excitation spectra of a series of exemplary $Lu_{2.91}Ce_{0.09}Al_5O_{12}$ phosphors with different $MgF_2$ additive concentrations, showing that the excitation spectra becomes more narrow when the $MgF_2$ additive concentration is increased. The data shows that the present green garnets exhibit a wide band of wavelengths over which the phosphors may be excited, ranging from about 380 to about 480 nm.

Figure 12:
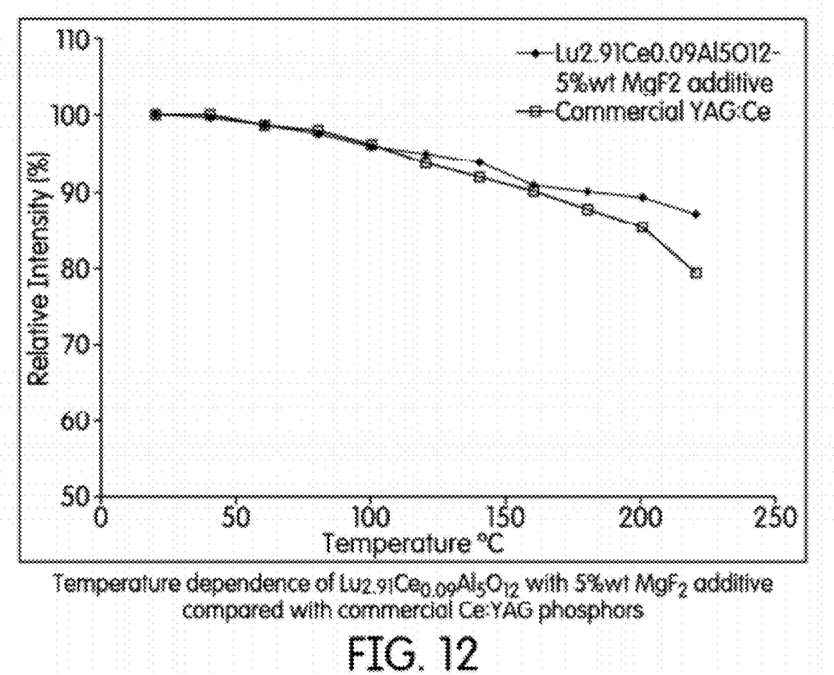
FIG. 12 shows the temperature dependence of an exemplary $Lu_{2.91}Ce_{0.09}Al_5O_{12}$ phosphor with a 5 wt % $MgF_2$ additive.

The thermal stability of the present garnet phosphors is exemplified by the lutetium containing compound $Lu_{2.91}Ce_{0.09}Al_5O_{12}$ with a 5 wt % $MgF_2$ additive; its thermal stability is compared with the commercially available phosphor $Ce^{3+}:Y_3Al_5O_{12}$. in FIG. 12. It may be observed that the thermal stability of the $Lu_{2.91}Ce_{0.09}Al_5O_{12}$ compound is even better than the YAG.

Applications to Backlighting and White Light Illumination Systems

According to further embodiments of the present invention, the present green garnets may be used in white light illumination systems, commonly known as "white LEDs," and in backlighting configurations for display applications. Such white light illumination systems comprise a radiation source configured to emit radiation having a wavelength greater than about 280 nm; and a halide anion-doped green garnet phosphor configured to absorb at least a portion of the radiation from the radiation source, and emit light having a peak wavelength ranging from 480 nm to about 650 nm.

Figure 13:
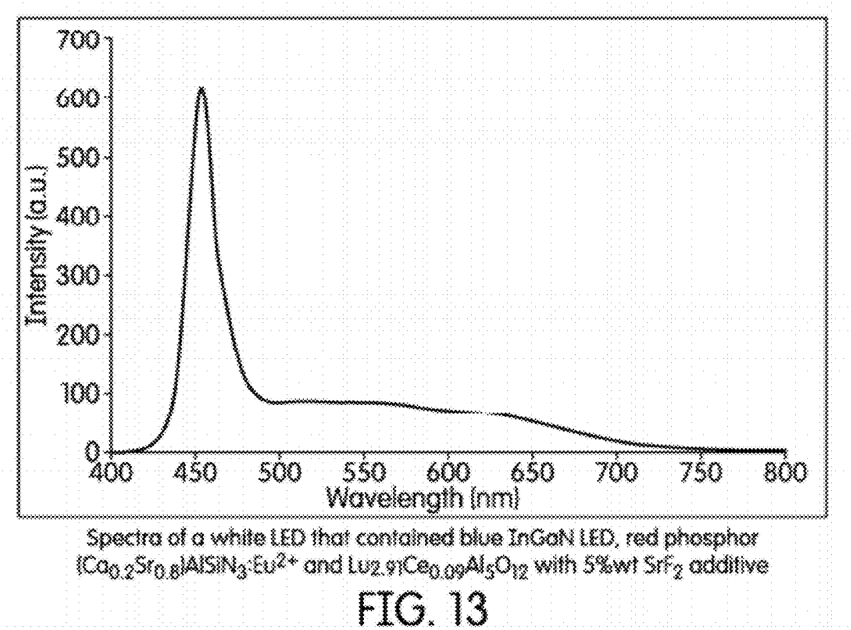
FIG. 13 shows the spectra of a white LED that includes an exemplary green-emitting, garnet-based phosphor having the formula $Lu_{2.91}Ce_{0.09}Al_5O_{12}$ with 5 wt % $SrF_2$ additive; the white LED also includes a red phosphor having the formula $(Ca_{0.2}Sr_{0.8})AlSiN_3:Eu^{2+}$, and when both green and red phosphors are excited with an InGaN LED emitting blue light, the resulting white light had the color properties CIE x=0.24, and CIE y=0.20.

FIG. 13 shows the spectra of a white LED that includes an exemplary green-emitting, garnet-based phosphor having the formula $Lu_{2.91}Ce_{0.09}Al_5O_{12}$ with a 5 wt. % $SrF_2$ additive. This white LED further includes a red phosphor having the formula $(Ca_{0.2}Sr_{0.8})AlSiN_3:Eu^{2+}$. When both green garnet and red nitride phosphors are excited with an InGaN LED emitting blue light, the resulting white light displayed the color coordinates CIE x=0.24, and CIE y=0.20. The sample in FIG. 13 that contains the yellow-green silicate.

Figure 14:
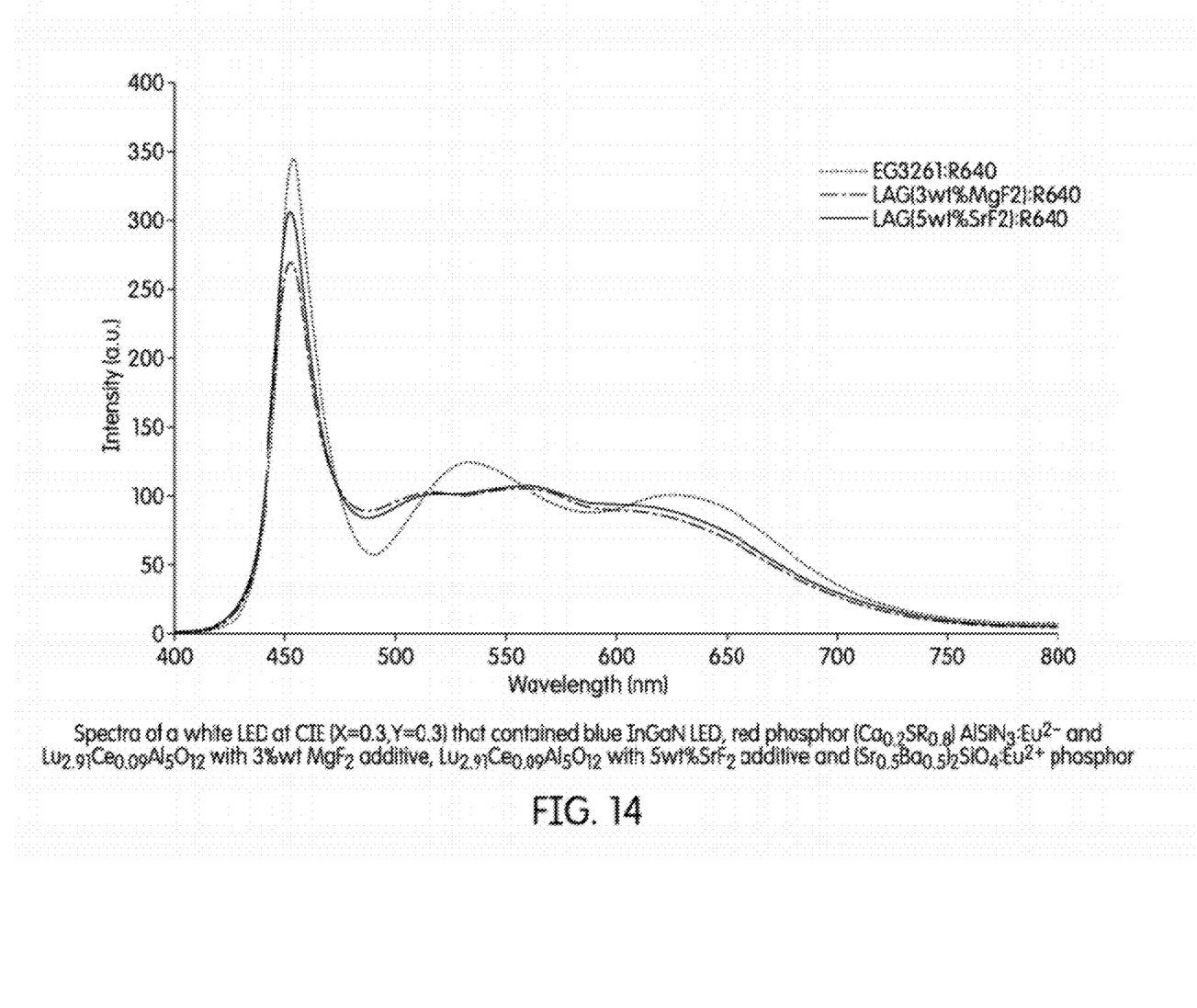
FIG. 14 is the spectra of a white LED with the following components: a blue InGaN LED, a green garnet having the formula $Lu_{2.91}Ce_{0.09}Al_5O_{12}$ with either 3 or 5 wt % additives, a red nitride having the formula $(Ca_{0.2}Sr_{0.8})AlSiN_3:Eu^{2+}$ or a silicate having the formula $(Sr_{0.5}Ba_{0.5})_2SiO_4:Eu^{2+}$, wherein the white light has the color coordinates CIE (x=0.3, y=0.3)

FIG. 14 is the spectra of a white LED with the following components: a blue InGaN LED, a green garnet having the formula $Lu_{2.91}Ce_{0.09}Al_5O_{12}$ with either 3 or 5 wt % additives, a red nitride having the formula $(Ca_{0.2}Sr_{0.8})AlSiN_3:Eu^{2+}$ or a silicate having the formula $(Sr_{0.5}Ba_{0.5})_2SiO_4:Eu^{2+}$, wherein the white light has the color coordinates CIE (x=0.3, y=0.3). The sample that shows the most prominent double peak is the one labeled "EG3261+R640," where the EG3261 designation represents the $(Sr_{0.5}Ba_{0.5})_2SiO_4:Eu^{2+}$ phosphor, in combination with the red R640 $(Ca_{0.2}Sr_{0.8})AlSiN_3:Eu^{2+}$ phosphor emitting at about 640 nm. The two peaks labeled LAG (3 wt % $MgF_2$)+R640 and LAG (5 wt % $SrF_2$)+R640 demonstrate a much more uniform emission of perceived white light over the wavelength range 500 to 650 nm, an attribute desirable in the art.

Figure 15:
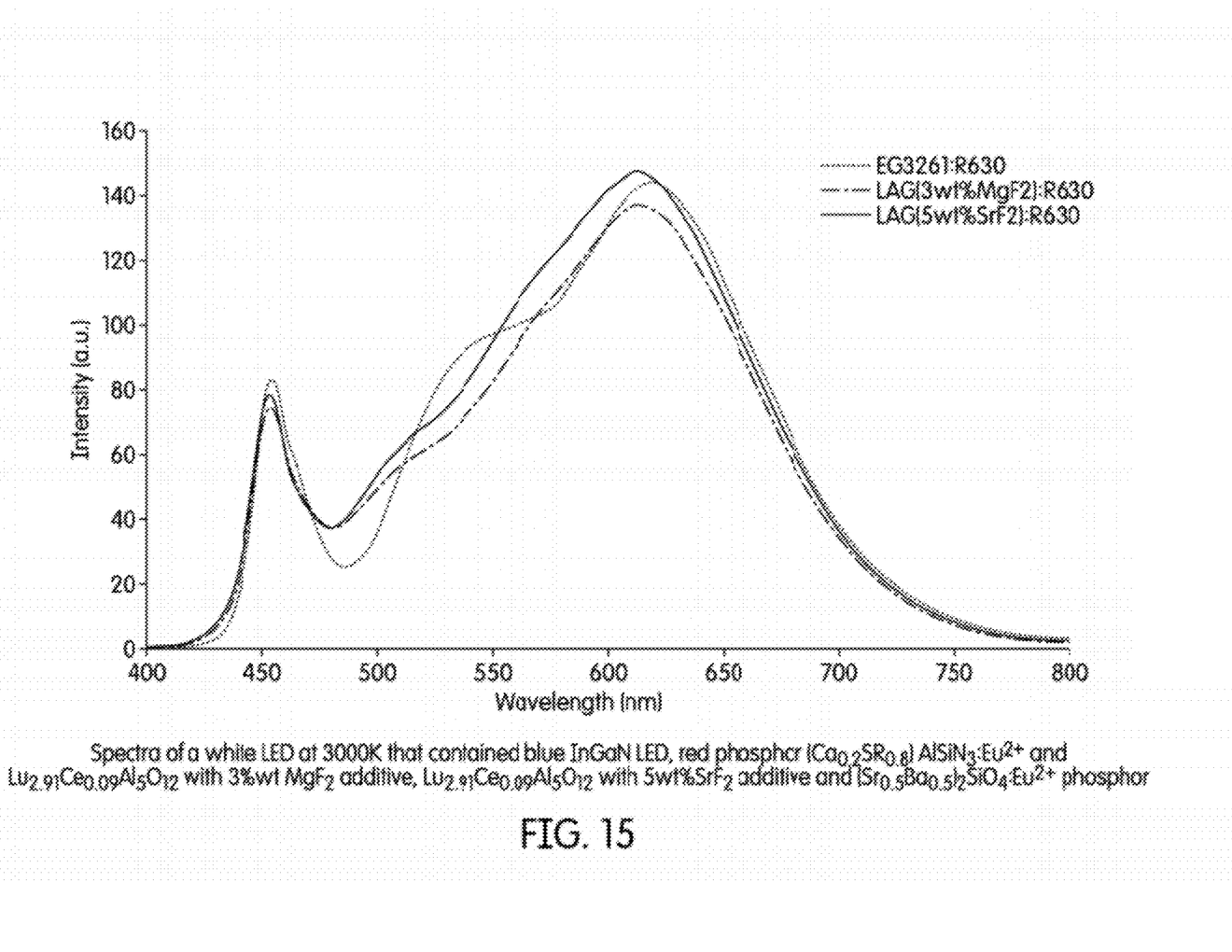
FIG. 15 is the spectra of the white LED systems of FIG. 14, in this instance measured at 3,000 K.

FIG. 15 is the spectra of the white LED systems of FIG. 14, in this instance measured at 3,000 K.

In embodiments of the present invention, the red nitride that may be used in conjunction with the green aluminate may have the general formula $(Ca,Sr)AlSiN_3:Eu^{2+}$, where the red nitride may further comprise an optional halogen, and wherein the oxygen impurity content of the red nitride phosphor may be less than or equal to about 2 percent by weight.

Optical and Physical Data in Table Form

A summary of exemplary data is tabulated in the following two tables. In Table 1 is the testing results of a $Lu_{2.91}Ce_{0.09}Al_5O_{12}$ based phosphor with three different $MgF_2$ additive levels. Table 2 tabulates the testing results of a $Lu_{2.91}Ce_{0.09}Al_5O_{12}$ based compound with four different $SrF_2$ Additive. These results summarize and confirm that $MgF_2$ and $SrF_2$ additives in $Lu_{2.91}Ce_{0.09}Al_5O_{12}$ shift the emission peak wavelength to shorter wavelengths, where the emission intensity is increased with increasing $MgF_2$ and $SrF_2$ concentration. The particle size also increases with the increasing $MgF_2$ and $SrF_2$ additive concentration.

TABLE 1

Testing results of $Lu_{2.91}Ce_{0.09}Al_5O_{12}$ with different $MgF_2$ levels of additive

| $MgF_2$ (wt %) | CIE x | CIE y | Emission Peak Wavelength (nm) | Relative Intensity (%) | Particle Size D50 (um) |
|---|---|---|---|---|---|
| 1 | 0.3635 | 0.5862 | 526.88 | 58.04 | 4.01 |
| 2 | 0.3554 | 0.5778 | 529.56 | 78.47 | 7.38 |
| 3 | 0.3336 | 0.5776 | 514.22 | 105.13 | 9.30 |

TABLE 2

Testing results of $Lu_{2.91}Ce_{0.09}Al_5O_{12}$ with different levels of $SrF_2$ additive

| $SrF_2$ (wt %) | CIE x | CIE y | Emission Peak Wavelength (nm) | Relative Intensity (%) | Particle Size D50 (um) |
|---|---|---|---|---|---|
| 1 | 0.3677 | 0.5732 | 534.64 | 71.65 | 3.84 |
| 2 | 0.3677 | 0.5732 | 534.64 | 85.82 | 5.24 |
| 3 | 0.3555 | 05718 | 532.43 | 112.40 | 9.90 |
| 5 | 0.3405 | 0.5748 | 523.44 | 107.67 | 11.38 |

What is claimed is:

1. A cerium-activated, green-emitting lutetium aluminate phosphor consisting of lutetium, cerium, at least one alkaline earth metal, aluminum, oxygen, and at least one halogen, wherein the phosphor is configured to absorb excitation radiation having a wavelength ranging from about 380 nm to about 480 nm, and to emit light having a peak emission wavelength ranging from about 500 nm to about 550 nm.

2. The green-emitting lutetium aluminate phosphor of claim 1, wherein the excitation radiation has a wavelength ranging from about 420 nm to about 480 nm.

3. The cerium-activated, green-emitting lutetium aluminate phosphor of claim 1, wherein said at least one alkaline earth metal is magnesium.

4. The cerium-activated, green-emitting lutetium aluminate phosphor of claim 1, wherein said at least one alkaline earth metal is strontium.

5. The cerium-activated, green-emitting lutetium aluminate phosphor of claim 1, wherein said at least one halogen is fluorine.

6. A green-emitting phosphor comprising a lutetium aluminate, an $MF_2$ additive, and a cerium activator;
wherein M is a divalent, alkaline earth metal selected from the group consisting of Mg and Sr; and
wherein the $MF_2$ additive is included in the phosphor in amounts ranging up to about 5 weight percent.

7. The green-emitting phosphor of claim 6, wherein said green-emitting phosphor is configured to absorb excitation radiation having a wavelength ranging from about 420 nm to about 480 nm, and to emit light having a peak emission wavelength ranging from about 500 nm to about 550 nm.

8. The green-emitting phosphor of claim 6, wherein the lutetium aluminate is a LAG-based compound having the formula $Lu_3Al_5O_{12}$.

9. The green-emitting phosphor of claim 6, further including any of the elements yttrium (Y), scandium (Sc), gadolinium (Gd), and terbium (Tb).

10. The green-emitting phosphor of claim 6, wherein $M^{2+}$ occupies $Lu^{3+}$ lattice sites.

11. A green-emitting phosphor comprising a halogenated aluminate having the formula:

$$A_3B_xAl_5O_{12}C_y:Ce, \text{ where}$$

A is Lu;
B is at least one of Mg or Sr;
C is F;
y is about 2x; and
the amount by weight of B plus C ranges from greater than zero to about 5 weight percent.

12. The green-emitting phosphor of claim 11, wherein said green-emitting phosphor is configured to absorb excitation radiation having a wavelength ranging from about 420 nm to about 480 nm, and to emit light having a peak emission wavelength ranging from about 500 nm to about 550 run.

13. A green-emitting phosphor comprising a halogenated aluminate having the formula:

$$(Y,Lu,A)_x(Al)_5(O,F,Cl)_{12+(3/2)x}:Ce,Eu \text{ where}$$

A is selected from the group consisting of Mg, Sr, Ca, and Ba; and
x ranges from about 2.5 to about 3.5, but does not equal 3.

14. A green-emitting phosphor comprising an aluminate having the formula:

$$(A_{1-x}^{3+}B_x^{2+})_mAl_5(O_{1-y}^{2-}C_y^{1-})_n:Ce, \text{ where}$$

A is at least one of Y, Sc, Gd, Tb, or Lu;
B is at least one of Mg, Sr, Ca, or Ba;
C is at least one of F, Cl, or Br;
$0 \leq x \leq 0.5$;
$0 \leq y \leq 0.5$;
$2 \leq m \leq 4$; and
$10 \leq n \leq 14$;
subject to the proviso that m is not equal to 3.

15. The green-emitting phosphor of claim 14, wherein said green-emitting phosphor is configured to absorb excitation radiation having a wavelength ranging from about 420 nm to about 480 nm, and to emit light having a peak emission wavelength ranging from about 500 nm to about 550 nm.

16. A green-emitting phosphor comprising an aluminate having the formula:

$$(A_{1-x}^{3+}B_x^{2+})_mAl_5(O_{1-y}^{2-}C_y^{1-})_n:Ce, \text{ where}$$

A is at least one of Y, Sc, Gd, Tb, or Lu;
B is at least one of Mg, Sr, Ca, or Ba;
C is at least one of F, Cl, or Br;
$0 \leq x \leq 0.5$;
$0 \leq y \leq 0.5$;
$2 \leq m \leq 4$; and
$10 \leq n \leq 14$;
subject to the proviso that n is not equal to 12.

17. The green-emitting phosphor of claim 16, wherein said green-emitting phosphor is configured to absorb excitation radiation having a wavelength ranging from about 420 nm to about 480 nm, and to emit light having a peak emission wavelength ranging from about 500 nm to about 550 nm.

18. A white LED comprising:
a radiation source for configured to provide radiation having a wavelength greater than about 280 nm;
a cerium-activated, green-emitting lutetium aluminate phosphor consisting of lutetium, cerium, at least one alkaline earth metal, aluminum, oxygen, and at least one halogen, wherein the phosphor is configured to absorb excitation radiation having a wavelength ranging from about 420 nm to about 480 nm, and to emit light having a peak emission wavelength ranging from about 500 nm to about 550 nm; and
at least one of a red-emitting phosphor or a yellow-emitting phosphor.

19. A white LED comprising:
a radiation source for configured to provide radiation having a wavelength greater than about 280 nm;
a green-emitting phosphor comprising a halogenated aluminate having the formula:

$$(A_{1-x}^{3+}B_x^{2+})_mAl_5(O_{1-y}^{2-}C_y^{1-})_n:Ce, \text{ where}$$

A is at least one of Lu, Sc, Gd, or Tb;
B is at least one of Mg, Sr, Ca, or Ba;
C is at least one of F, Cl, or Br;
$0 \leq x \leq 0.5$;
$0 \leq y \leq 0.5$;
$2 \leq m \leq 4$;
$10 \leq n \leq 14$; and
subject to the proviso that m is not equal to 3; and
at least one of a red-emitting phosphor or a yellow-emitting phosphor.

20. The white LED of claim 19, wherein the red-emitting phosphor is a nitride.

21. The white LED of claim 20, wherein the nitride has the formula $(Ca, Sr)AlSiN_3:Eu^{2+}$.

22. The white LED of claim 19, wherein the yellow-emitting phosphor is a silicate.

23. The white LED of claim 22, wherein the silicate has the formula $(Sr,Ba)_2SiO_4:Eu^{2+}$.

24. A general lighting device, comprising:
a cerium-activated, green-emitting lutetium aluminate phosphor consisting of lutetium, at least one alkaline earth metal, aluminum, oxygen, and at least one halogen, wherein the phosphor is configured to absorb excitation radiation having a wavelength ranging from about 420 nm to about 480 nm, and to emit light having a peak emission wavelength ranging from about 500 nm to about 550 nm.

25. The general lighting device of claim 24, wherein said at least one alkaline earth metal is magnesium.

26. The general lighting device of claim 24, wherein said at least one alkaline earth metal is strontium.

27. The general lighting device of claim 24, wherein said at least one halogen is fluorine.

28. A green-emitting phosphor comprising a lutetium aluminate, a $SrF_2$ additive, and a cerium activator, wherein the $SrF_2$ additive is included in the phosphor in amounts ranging from about 2 to about 5 weight percent.

29. The green-emitting phosphor of claim 28, wherein said green-emitting phosphor is configured to absorb excitation radiation having a wavelength ranging from about 420 nm to about 480 nm, and to emit light having a peak emission wavelength ranging from about 523 nm to about 535 nm.

30. The green-emitting phosphor of claim 28, wherein the lutetium aluminate is a LAG-based compound having the formula $Lu_3Al_5O_{12}$.

31. The green-emitting phosphor of claim 28, further including any of the elements yttrium (Y), scandium (Sc), gadolinium (Gd), and terbium (Tb).

32. A green-emitting phosphor comprising a lutetium aluminate, a $MgF_2$ additive, and a cerium activator, wherein the MgF$_2$ additive is included in the phosphor in amounts ranging from about 1 to about 5 weight percent.

33. The green-emitting phosphor of claim 32, wherein said green-emitting phosphor is configured to absorb excitation radiation having a wavelength ranging from about 420 nm to about 480 nm, and to emit light having a peak emission wavelength ranging from about 510 nm to about 527 nm.

34. The green-emitting phosphor of claim 32, wherein the lutetium aluminate is a LAG-based compound having the formula Lu$_3$Al$_5$O$_{12}$.

35. The green-emitting phosphor of claim 32, further including any of the elements yttrium (Y), scandium (Sc), gadolinium (Gd), and terbium (Tb).

36. A general lighting device, comprising:
   a green-emitting phosphor comprising a halogenated aluminate having the formula:

$(A_{1-x}^{3+}B_x^{2+})_m Al_5(O_{1-y}^{2-}C_y^{1-})_n$:Ce, where

A is at least one of Lu, Sc, Gd, or Tb;
   B is at least one of Mg, Sr, Ca, or Ba;
   C is at least one of F, Cl, or Br;
   $0 \leq x \leq 0.5$;
   $0 \leq y \leq 0.5$;
   $2 \leq m \leq 4$;
   $10 \leq n \leq 14$; and
   subject to the proviso that m is not equal to 3.

* * * * *

UNITED STATES PATENT AND TRADEMARK OFFICE
CERTIFICATE OF CORRECTION

PATENT NO. : 8,529,791 B2  Page 1 of 1
APPLICATION NO. : 13/181226
DATED : September 10, 2013
INVENTOR(S) : Yusong Wu et al.

It is certified that error appears in the above-identified patent and that said Letters Patent is hereby corrected as shown below:

In the Claims

In Column 10, Claim 2, Line 45,     after "The" insert -- cerium-activated, --.

In Column 11, Claim 11, Line 12,    delete "$A_3B_xAl_5O_{12}Cy:Ce$" and insert
-- $A_3B_xAl_5O_{12}C_y:Ce$ --, therefor.

In Column 11, Claim 12, Line 23,    delete "run" and insert -- nm --, therefor.

Signed and Sealed this
Fifteenth Day of April, 2014

Michelle K. Lee
*Deputy Director of the United States Patent and Trademark Office*